No. 894,605. PATENTED JULY 28, 1908.
J. B. CORNWALL.
COTTON GINNING MACHINERY.
APPLICATION FILED AUG. 26, 1907.

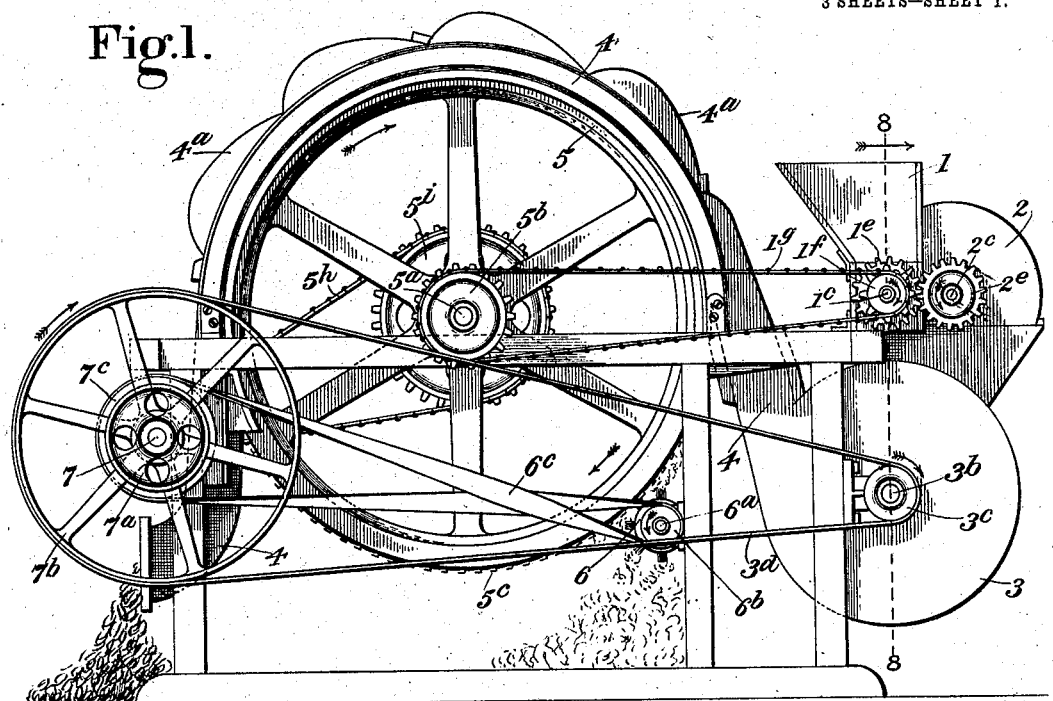
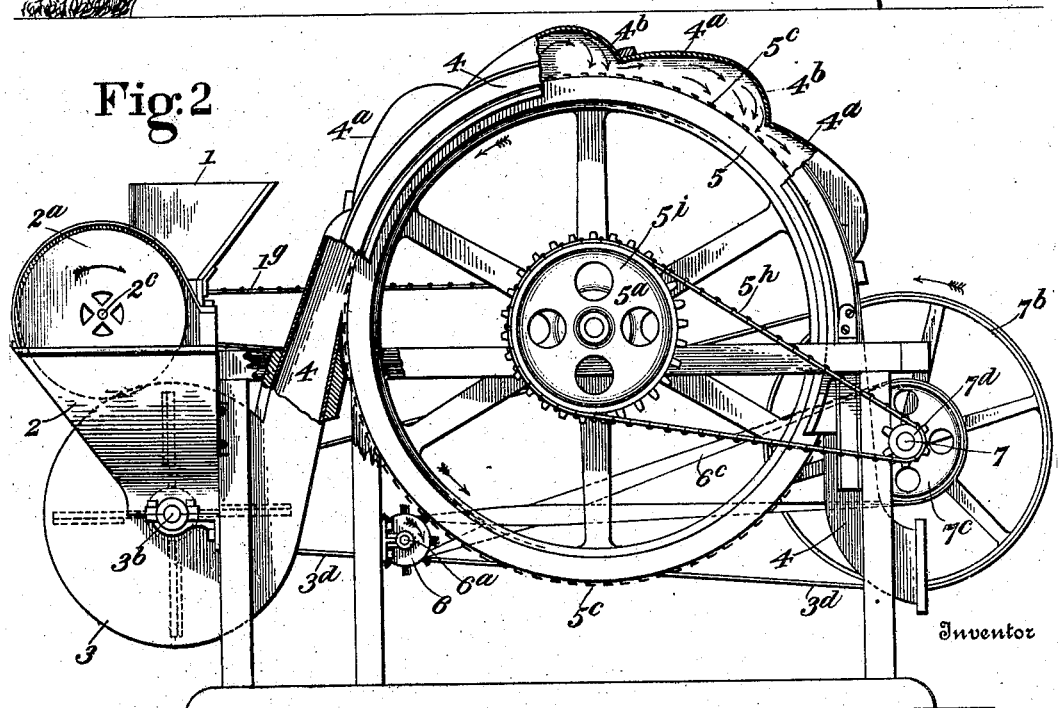

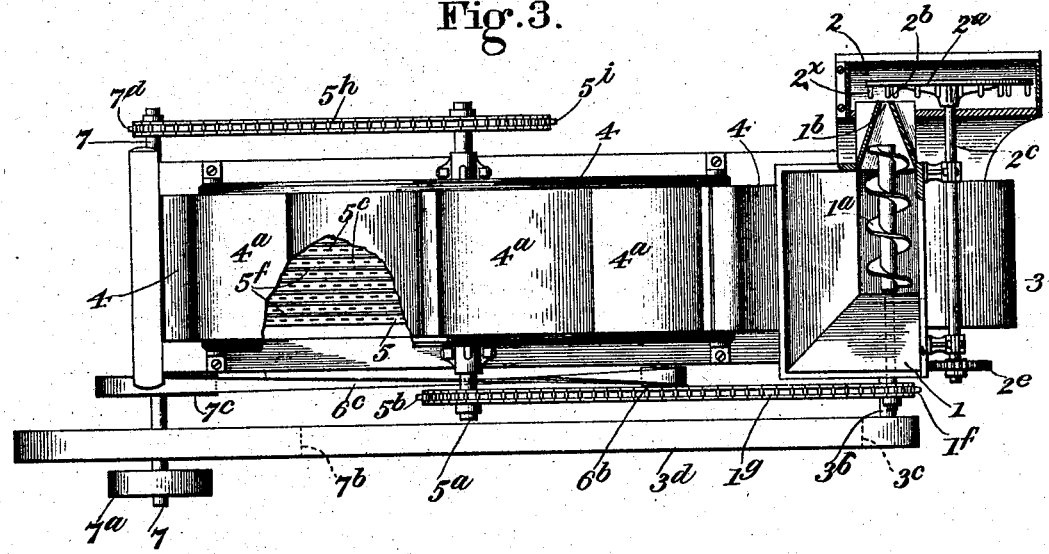
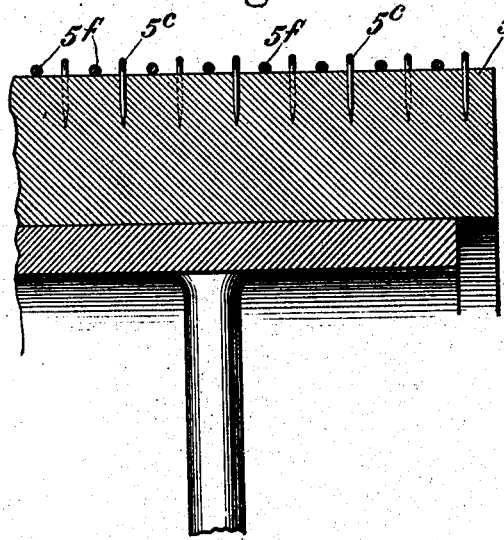
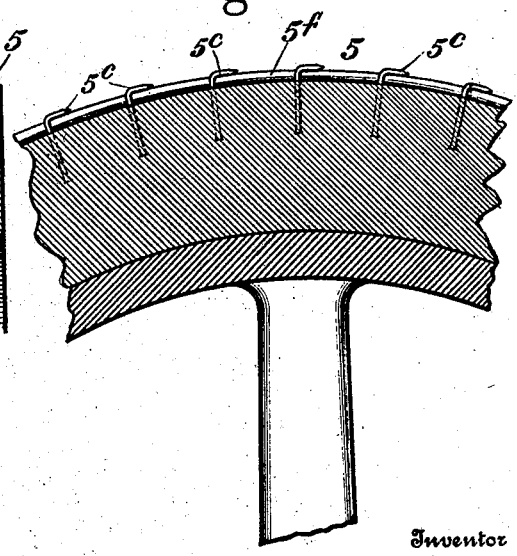

3 SHEETS—SHEET 3.

Inventor
John B. Cornwall

Witnesses

By Alexander Towell
Attorney

UNITED STATES PATENT OFFICE.

JOHN B. CORNWALL, OF MOLINE, ILLINOIS, ASSIGNOR TO BARNARD AND LEAS MANUFACTURING COMPANY, OF MOLINE, ILLINOIS.

COTTON-GINNING MACHINERY.

No. 894,605.

Specification of Letters Patent.

Patented July 28, 1908.

Application filed August 26, 1907. Serial No. 390,202.

*To all whom it may concern:*

Be it known that I, JOHN B. CORNWALL, of Moline, in the county of Rock Island and State of Illinois, have invented certain new and useful Improvements in Cotton-Ginning Machinery; and I hereby declare that the following is a full, clear, and exact description thereof, reference being had to the accompanying drawings, which form part of this specification.

This invention is an improvement in cotton ginning machinery, and is particularly designed for cleaning the boll hulls discharged from the usual ginning machines.

The invention provides a machine for cleaning the boll hulls that have not fully opened when the cotton is gathered, and are thrown out by the gin in the first ginning of the cotton, and which hulls contain a considerable amount of cotton adhering thereto so closely as not to be removed by the ordinary ginning machines.

The invention may be embodied for example in the machine illustrated in the accompanying drawings, which machine is designed to catch the bunches of cotton which contain the seed and to reject the boll hulls which have been separated from the cotton by the action of the feeder and fan, the hulls being blown out at the opposite end of the machine from the feeder and the cotton discharged at another point.

I will now explain the structure and operation of the machine illustrated in the accompanying drawings,—but the invention is not restricted to the particular structure shown, the essential features and combinations of parts for which protection is desired being set forth in the claims attached to the specification.

Figure 6:
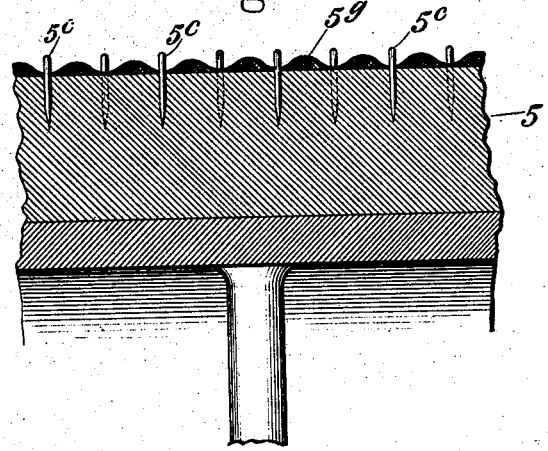
Figure 7:
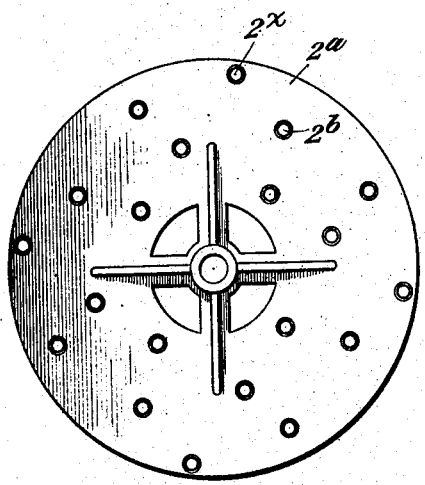
Figure 8:
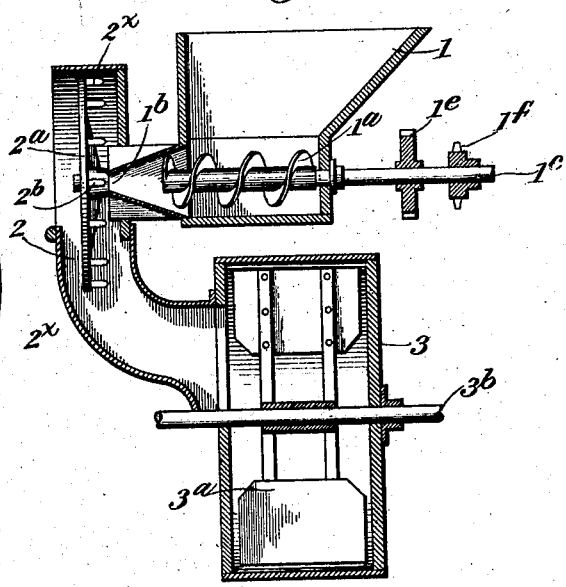

In said drawings—Figure 1 is an elevation of the feed side of the complete machine. Fig. 2 is a view of the opposite side thereof, partly in section. Fig. 3 is a top plan view with parts broken away to show the interior construction. Figs. 4 and 5 are detail sectional views of the cleaning wheel. Fig. 6 is a detail view of a modified construction of cleaner wheel surface. Fig. 7 is a detail view of the beater wheel. Fig. 8 is a transverse section on line 8—8, Fig. 1.

A hopper 1 has a conveyer $1^a$ in its bottom, the shaft of which is journaled only at one end, the inner end of the conveyer being free and adapted to discharge material from the hopper through a contracted nozzle or outlet $1^b$, into a suction trunk 2 in which is a rotatable beater wheel $2^a$ mounted on a shaft $2^c$ and provided with projections or pins $2^b$ which are adapted to strike the material issuing from the nozzle $1^b$ and separate it thoroughly and discharge it into the suction trunk 2.

The feeder disk or beater wheel as shown in Fig. 7 is of such diameter that the row of teeth $2^x$ around its outer portion practically overlap the discharge opening of the nozzle $1^b$.

The shaft $2^c$ may be driven from the conveyer shaft $1^c$ by gears $1^e$, $2^e$, as shown. The conveyer being driven by any suitable means,—or as shown, by a sprocket chain $1^g$ engaging sprockets $1^f$ on the conveyer shaft, and a larger sprocket $5^b$ on the shaft $5^a$ of the cleaner wheel 5 hereafter described.

The suction trunk 2 connects with the inlet of a fan chamber 3 within which is a fan $3^a$ mounted on shaft $3^b$ and driven in any suitable manner,—or as shown by means of a belt $3^d$ running over a pulley $3^c$ on the fan shaft, and over a pulley $7^b$ on the main or drive shaft 7 hereinafter explained.

The outlet of the fan casing connects with an air blast passage or trunk 4 which extends over and around—say one-half the circumference of the cleaner wheel 5, which wheel is of large diameter, and is mounted upon a shaft $5^a$ journaled in bearings in the main frame of the machine.

The trunk 4 terminates below the center of the cleaner wheel, at the end opposite the fan chamber, and discharges the hulls at that end of the machine, away from the separated cotton.

The part of trunk 4 concentric to the wheel 5, has its inner wall formed by the periphery of said wheel (see Fig. 2); but its sides and outer periphery are tightly closed; and the side walls of the air trunk are fitted sufficiently closely to the wheel to prevent any material diminution in force of the air blast through said trunk.

The concentric part of trunk 4 is provided with a series of hollow protuberances $4^a$ forming internal pockets which gradually enlarge from their inlet ends toward their outlet ends, the walls $4^b$ at the outlet ends of the pockets being curved more abruptly inward so as to direct the material blown through the trunk and pockets inwardly against the oppositely moving peripheral surface of the cleaner wheel 5, as indicated in Fig. 2.

The cleaner wheel may be of any desired construction having a wooden rim or periphery. In the structure shown in Figs. 1, 4 and 5, said wheel has a wooden periphery, and is provided with circumferentially disposed rows of teeth $5^c$, which may be formed in any suitable manner; as shown, for example they are formed of L-shaped tacks, the shanks of which are driven radially into the rim of the wheel, and the points thereof lie parallel with the surface of the wheel and extend in the direction of rotation thereof, (which is toward the fan.) In order to prevent the boll hulls engaging two of the teeth simultaneously and thus be carried around with the cotton, the teeth are arranged between annular ribs on the periphery of the wheel, which ribs can be formed in various ways. Fig. 4 shows how the ribs prevent the hulls engaging more than one hook at a time.

As shown in Figs. 4 and 5 the annular ribs are formed by wire hoops or rings $5^f$ secured around the circumference of the wheel between the rows of teeth. As shown in Fig. 6 the periphery of the wheel may be covered with a corrugated sheet of metal $5^d$ which would answer the same purpose. Obviously the ribs may be formed in other ways.

The cleaner wheel is rotated toward the fan by suitable means. As shown a sprocket chain $5^h$ runs over a sprocket $5^i$ on shaft $5^a$, and over a sprocket $7^d$ on the drive shaft 7.

At the lower side of the cleaner wheel and adjacent the fan, is a rotary brush 6 mounted on a shaft $6^a$ and driven at a high speed in a direction opposite to the cleaner wheel (so that the peripheries of the cleaner wheel and brush move in the same direction at the point of impingement). As shown the brush is driven by a belt $6^c$ running over pulley $6^b$ on the brush shaft, and over a pulley $7^c$ on the main shaft. The belt $6^c$ being crossed so as to rotate the brush oppositely to the cleaner wheel, and at such speed that the brush will pick the cotton off the teeth and discharge it under the cleaner wheel, as indicated in the drawings.

The main shaft 7 is journaled on the end of the main frame opposite the fan chamber and may be driven in any suitable manner, as by a power-driven belt running over a pulley $7^a$ on the main shaft.

The operation of the machine is as follows: The boll-hulls (or "grabbot") are fed into the hopper 1 and conveyed by conveyer $1^a$ into the nozzle $1^b$. The mass of cotton compressed into the nozzle is separated and thrown in a shower into the suction trunk 2 which leads to the fan, by the beater wheel, or toothed disk $2^a$—which makes an even and open feed of the hulls to the machine, which hulls would otherwise pass into the machine in masses. The hulls then pass into the fan casing and the fan beats the hulls loose from the cotton and discharges the material into the air trunk 4. Owing to the peculiar form of the pockets $4^a$ of this trunk the material is caused to repeatedly impinge against the toothed cleaner wheel. In this way the loosened bunches of cotton on the hulls are engaged by the teeth on the cleaner wheel and are conveyed against the direction of the air blast, while the hulls are not able to engage the teeth on account of the peculiar form of the surface of the cleaner wheel and are driven through the trunk and out at the rear end thereof.

Some of the peculiar advantages of the machine are having the mass of hulls effectively broken up and separated by the beater wheel and the fan before it encounters the cleaning wheel. Also using a blast of air of sufficient strength to carry away the small impurities from the cotton and to liberate hulls entangled in the cotton. Also the arrangement whereby the material passing through the trunk are repeatedly directed against the periphery of the cleaner wheel; also the structure of the cleaner wheel whereby the teeth are located between ridges or guards which prevent hulls catching on two adjacent teeth.

Having described my invention what I claim as new and desire to secure by Letters Patent is:

1. In a machine for separating cotton from boll hulls, the combination of a cleaner wheel, an air trunk partly surrounding the periphery of said wheel, and having its inner wall formed by the periphery of said wheel, and having its outer wall formed with a series of hollow protuberances forming internal pockets whose outlet end walls are curved inwardly so as to direct the hulls passing through the pockets inwardly against the periphery of the wheel.

2. In a machine for separating cotton from boll hulls, the combination of a cleaner wheel, an air trunk partly surrounding the periphery of said wheel, and having its outer wall formed with a series of hollow protuberances forming internal pockets whose outlet end walls are curved inwardly so as to direct the hulls passing through the pockets inwardly against the periphery of the wheel; with a fan chamber, and fan for blowing the hulls through the said trunk and pockets in a direction opposite the rotation of the wheel.

3. In a grabbot cleaning machine, the combination of a hopper having a contracted outlet, a conveyer for discharging grabbot from said hopper, a suction trunk communicating with the outlet of the hopper, a fan chamber into which the suction trunk discharges, a rotary beater wheel in said suction trunk adapted to strike and separate the material entering said trunk, with means for separating the cotton from the hulls discharged from the fan casing, substantially as described.

4. In a grabbot cleaning machine, the combination of a hopper having a contracted outlet, a conveyer for discharging grabbot from said hopper, a suction trunk communicating with the outlet of the hopper, a fan chamber into which the suction trunk discharges, a rotary beater wheel in said suction trunk adapted to strike and separate the material entering said trunk; with a cleaner wheel having a toothed periphery, an air blast trunk into which the hulls are driven by the fan, said trunk partly surrounding said cleaner wheel and having surfaces adapted to direct the hulls repeatedly against the surface of the cleaner wheel.

5. In a grabbot cleaning machine, the combination of a toothed cleaner wheel, an air trunk partly surrounding said wheel and having its inner wall partly formed by the periphery of said wheel and its outer wall formed with pockets, a fan casing and fan for creating an air current through said trunk in a direction contrary to the rotation of the wheel, a hopper having a contracted outlet, a conveyer for discharging material from the hopper through said outlet, a suction trunk for directing material from the outlet into the said fan casing, and a beater wheel in said suction trunk adapted to disseminate the hulls before entering the fan casing.

6. In a grabbot cleaning machine, the combination of a feed hopper having a contracted outlet, means for ejecting material through said outlet, a trunk into which the material is discharged, a beater wheel in said trunk adapted to disseminate the entering grabbot, a fan chamber communicating with the outlet of said trunk, a fan in said casing adapted to further disseminate the material, a curved air blast trunk communicating with the outlet of the fan chamber, a toothed cleaner wheel forming part of the inner wall of said air-blast trunk, and means for removing cotton from said cleaner wheel.

7. In a grabbot cleaning machine, the combination of a feed hopper having a contracted outlet, a worm conveyer therein adapted to eject material through said outlet, a suction trunk into which the material is discharged, a beater wheel in said trunk adapted to disseminate the grabbot entering said suction trunk; a fan chamber communicating with the outlet of said suction trunk, and a fan in said casing adapted to further disseminate the material; with a toothed cleaner wheel, a curved air blast trunk communicating with the outlet of the fan-chamber, and partly surrounding said cleaner wheel, the latter forming the inner wall of part of said air-blast trunk, said air trunk being provided with pockets having inclined end walls adapted to direct material against the periphery of the wheel, and a rotary brush for removing cotton from said cleaner wheel, substantially as described.

8. A cleaner wheel for the purpose specified having circumferential bands of wire secured around its periphery, and circumferential series of teeth driven into the wheel in the spaces between the bands, substantially as described.

9. A cleaner wheel for the purpose specified, having a wooden rim, circumferential rows of separate teeth driven into its periphery, and circumferential metallic bands secured around its periphery intermediate the rows of teeth, for the purpose specified.

In testimony that I claim the foregoing as my own, I affix my signature in presence of two witnesses.

JOHN B. CORNWALL.

Witnesses:
ABRAM H. JOSEPH,
M. L. EKDAHL.